(12) United States Patent
Inomata et al.

(10) Patent No.: US 12,043,775 B2
(45) Date of Patent: Jul. 23, 2024

(54) ADHESIVE FILM

(71) Applicant: RIKEN TECHNOS CORPORATION, Tokyo (JP)

(72) Inventors: Hitomi Inomata, Tokyo (JP); Takio Wakugawa, Tokyo (JP)

(73) Assignee: RIKEN TECHNOS CORPORATION (JP)

( * ) Notice: Subject to any disclaimer, the term of this patent is extended or adjusted under 35 U.S.C. 154(b) by 0 days.

(21) Appl. No.: 16/345,519

(22) PCT Filed: Aug. 28, 2017

(86) PCT No.: PCT/JP2017/030774
§ 371 (c)(1),
(2) Date: Apr. 26, 2019

(87) PCT Pub. No.: WO2018/079051
PCT Pub. Date: May 3, 2018

(65) Prior Publication Data
US 2019/0276710 A1 Sep. 12, 2019

(30) Foreign Application Priority Data
Oct. 26, 2016 (JP) ................................. 2016-209209

(51) Int. Cl.
*C09J 7/38* (2018.01)
*B32B 7/12* (2006.01)
(Continued)

(52) U.S. Cl.
CPC .................. *C09J 7/38* (2018.01); *B32B 7/12* (2013.01); *B32B 27/00* (2013.01); *B32B 27/30* (2013.01);
(Continued)

(58) Field of Classification Search
CPC ... C09J 7/38; C09J 7/245; C09J 133/00; C09J 133/08; C09J 133/10; C09J 2433/00;
(Continued)

(56) References Cited

U.S. PATENT DOCUMENTS 3,355,412 A * 11/1967 Hart ...................... C08F 220/18
524/379
6,482,523 B1 11/2002 Morikawa et al.
(Continued)

FOREIGN PATENT DOCUMENTS

EP 0601793 A2 6/1994
EP 1528091 A1 5/2005
(Continued)

OTHER PUBLICATIONS

Machine translation of JP 2016-079232A (Year: 2016).*
(Continued)

*Primary Examiner* — Scott R. Walshon
(74) *Attorney, Agent, or Firm* — Bracewell LLP; Brad Y. Chin

(57) ABSTRACT

In one embodiment, there is provided an adhesive film having (α) a layer of polyvinyl chloride resin film and (β) an adhesive layer in the stated order from the surface-layer side, where the (β) adhesive layer is formed from an adhesive including: (A) 100 parts by mass of an acrylic polymer that satisfies the features (a1) and (a2), specifically (a1) an acid value of 18-27 mg KOH/g, and (a2) a mass-average molecular weight of 500,000 to 1,000,000; and (B) 0.1-3 parts by mass of a compound having two or more isocyanate groups per molecule. In another embodiment, there is provided an adhesive film having (α) a layer of polyvinyl chloride resin film and (β) an adhesive layer in the stated order from the surface-layer side, where the (β) adhesive layer has a tackiness of 12-25 N at a surface temperature of 5° C. and
(Continued)

has a tackiness of 12-23 N at a surface temperature of 35° C.

8 Claims, 2 Drawing Sheets

(51) Int. Cl.
    *B32B 27/00*     (2006.01)
    *B32B 27/30*     (2006.01)
    *C09J 7/24*     (2018.01)
    *C09J 133/00*     (2006.01)
    *C09J 133/10*     (2006.01)
    *C09J 175/04*     (2006.01)

(52) U.S. Cl.
    CPC ............. *B32B 27/304* (2013.01); *C09J 7/245* (2018.01); *C09J 133/00* (2013.01); *C09J 133/10* (2013.01); *C09J 175/04* (2013.01); *B32B 2333/12* (2013.01); *B32B 2607/02* (2013.01)

(58) Field of Classification Search
    CPC .. C09J 2301/408; C09J 2427/006; C09J 7/24; C09J 7/30; B32B 7/12; B32B 2607/02; E04F 13/002; E04F 13/0885; E04F 13/0887; D21H 27/20; D06N 7/0002
    See application file for complete search history.

(56) References Cited

U.S. PATENT DOCUMENTS

| | | | |
|---|---|---|---|
| 9,752,061 B2 | 9/2017 | Kato et al. | |
| 2009/0053449 A1* | 2/2009 | Hannington | ............... C09J 7/35 428/41.8 |
| 2009/0286073 A1* | 11/2009 | Hamano | ................ B32B 25/06 428/337 |
| 2009/0292095 A1* | 11/2009 | Niwa | ....................... C09J 7/385 526/307.6 |
| 2014/0120343 A1 | 5/2014 | Mase et al. | |
| 2017/0015872 A1* | 1/2017 | Iwasaki | ................ C08K 5/0025 |
| 2020/0031103 A1 | 1/2020 | Ito et al. | |

FOREIGN PATENT DOCUMENTS

| | | | | |
|---|---|---|---|---|
| EP | 2330168 | A1 | | 6/2011 |
| EP | 2918632 | A1 | | 9/2015 |
| EP | 3626783 | A1 | | 3/2020 |
| JP | H09235522 | A | | 9/1997 |
| JP | 2001302999 | A | | 10/2001 |
| JP | 2002317061 | A | | 10/2002 |
| JP | 2002544364 | A | | 12/2002 |
| JP | 2005139323 | A | | 6/2005 |
| JP | 2006070273 | A | | 3/2006 |
| JP | 2007246797 | A | | 9/2007 |
| JP | 2010053185 | A | | 3/2010 |
| JP | 2016079232 | A | * | 5/2016 |
| JP | 2016079232 | A | | 5/2016 |
| JP | 2016160401 | A | | 9/2016 |
| JP | 2016188459 | A | | 11/2016 |
| WO | 2014195887 | A1 | | 12/2014 |
| WO | WO-2015137437 | A1 | * | 9/2015 ........... C08K 5/0025 |

OTHER PUBLICATIONS

PCT/JP2017/030774 International Search Report dated Sep. 25, 2017; 4 pgs.
EP17865618.7 Supplementary Search Report dated May 6, 2020, 8 pgs.
CN201780066124.1 First Office Action dated Dec. 3, 2020, 7 pgs.
JP2018-547164 First Office Action dated Aug. 18, 2020, 14 pgs.
JP2018-547164 Decision of Rejection dated Jan. 27, 2021, 8 pgs.
KR10-2019-7011572 First Office Action dated May 20, 2021, 10 pgs.
IN201917016302 First Examination Report dated Mar. 22, 2021, 6 pgs.
TMI, 80-10 Tackiness Checker HTC-1, Testing Machines, Inc., available from Toyo Seiki Seisaku-sho, Jun. 30, 2021, 3 pgs.
Toyoseiki, Tackiness Checker Model HTC-1, No. 236, available from Toyo Seiki Seisaku-sho, Jan. 2013, 2 pgs.
Urahama, Fundamentals and Mechanical Properties of PSA Tapes 3. Three Fundamental Physical Properties, Journal of the Society of Rubber Science and Technology, Japan, vol. 76, No. 11 (2003), pp. 28-33.
EP17865618.7 First Substantive Examination Report dated Apr. 11, 2023, 5 pgs.
Sekisui Chemical Co., Ltd., Sekisui Plasticizer webpage, Dec. 29, 2010, https://www.sekisui.co.jp/search/detail-0517.html, 2 pgs.

* cited by examiner

ADHESIVE FILM

CROSS REFERENCE TO RELATED APPLICATIONS

This application claims the benefit of and priority to PCT/JP2017/030774, filed on Aug. 28, 2017, entitled (translation), "ADHESIVE FILM," which claims the benefit of and priority to Japanese Patent Application No. 2016-209209, filed on Oct. 26, 2016, which are hereby incorporated by reference in their entirety into this application.

BACKGROUND

Embodiments relate to a pressure-sensitive adhesive film. More specifically, embodiments relate to a pressure-sensitive adhesive film suitable for facing and decorating walls and the like.

DESCRIPTION OF RELATED ART

Conventionally, surfaces of walls made of woody materials, such as wood, plywood, laminated wood, particle board, and hardboard; metallic materials such as iron and aluminum; and inorganic materials, such as gypsum have been faced and decorated by the application of a faced and decorated pressure-sensitive adhesive film (so-called wallpaper). In such a case, it is required that the pressure-sensitive adhesive film be applied without causing appearance defects such as blistering (or swelling) and wrinkles due to air or foreign matters caught between the wall surface and the surface of the pressure-sensitive adhesive layer of the wallpaper. The pressure-sensitive adhesive film has, however, the following problem: in the case where the pressure-sensitive adhesive film is applied in the cold winter season, although the pressure-sensitive adhesive film seems to be successfully applied immediately after the application, the pressure-sensitive adhesive film may be blistered (or swollen) when the temperature of the room rises or when the pressure-sensitive adhesive film is exposed to sunlight coming in through the window after the application (hereinafter, this problem is sometimes abbreviated as a "problem of temporal blistering after low-temperature application").

In order to achieve the object of applying a pressure-sensitive adhesive film without causing appearance defects such as blistering and wrinkles, it has been proposed to provide an air vent groove in the pressure-sensitive adhesive layer (see, for example, Patent Literatures 1 and 2). According to a test made by the present inventors, however, these techniques cannot solve the problem of temporal blistering after low-temperature application.

CITATION LIST

Patent Literatures

PATENT LITERATURE 1: JP-A-2006-070273
PATENT LITERATURE 2: JP-A-2002-544364

SUMMARY

An object of the various embodiments of the subject application is to provide a pressure-sensitive adhesive film free from the problem of temporal blistering after low-temperature application.

As a result of intensive research, the present inventors have found that the above-mentioned object can be achieved by using a specific pressure-sensitive adhesive film according to various embodiments.

According to at least one embodiment, there is provided a pressure-sensitive adhesive film including (α) a layer of a polyvinyl chloride resin film and (β) a pressure-sensitive adhesive layer in this order from a surface layer side, where the pressure-sensitive adhesive layer (β) is formed from a pressure-sensitive adhesive including: (A) 100 parts by mass of an acrylic polymer that satisfies properties (a1) and (a2) shown below: (a1) an acid value of 18 to 27 mg KOH/g, and (a2) a mass-average molecular weight of 500,000 to 1,000,000; and (B) 0.1 to 3 parts by mass of a compound having two or more isocyanate groups per molecule.

According to at least one embodiment, there is provided a pressure-sensitive adhesive film including (α) a layer of a polyvinyl chloride resin film and (β) a pressure-sensitive adhesive layer in this order from a surface layer side, where a surface of the pressure-sensitive adhesive layer (β) has a tackiness of 12 to 25 N at a temperature of 5° C., and the surface of the pressure-sensitive adhesive layer (β) has a tackiness of 12 to 23 N at a temperature of 35° C.

According to at least one embodiment, the pressure-sensitive adhesive that forms the pressure-sensitive adhesive layer (β) satisfies properties (b1) and (b2) shown below: (b1) the pressure-sensitive adhesive has a peak top value of tan δ on the lowest temperature side of −20° C. to −5° C.; and (b2) the pressure-sensitive adhesive has a gel fraction of 30 to 75 mass %.

According to at least one embodiment, the pressure-sensitive adhesive layer (β) has an air vent groove in an adhesive surface thereof.

According to at least one embodiment, the polyvinyl chloride resin film has a yield point stress of 30 to 40 MPa as measured at a temperature of 5° C.

According to at least one embodiment, there is provided a pressure-sensitive adhesive film according to various embodiments as described above that is used for wallpaper.

The pressure-sensitive adhesive film according to various embodiments is free from the following problem: in the case where the pressure-sensitive adhesive film is applied in the cold winter season, although the pressure-sensitive adhesive film seems to be successfully applied immediately after the application, the pressure-sensitive adhesive film may be blistered when the temperature of the room rises or when the pressure-sensitive adhesive film is exposed to sunlight coming in through the window after the application. Further, the pressure-sensitive adhesive film according to various embodiments is excellent in initial pressure-sensitive adhesive force, peeling resistance, curling resistance, resistance to gap occurrence, bending applicability, air vent performance, impact resistance, and stretchability under heating. Therefore, the pressure-sensitive adhesive film according to various embodiments can be suitably used for facing and decorating walls and the like.

DETAILED DESCRIPTION

Figure 1:
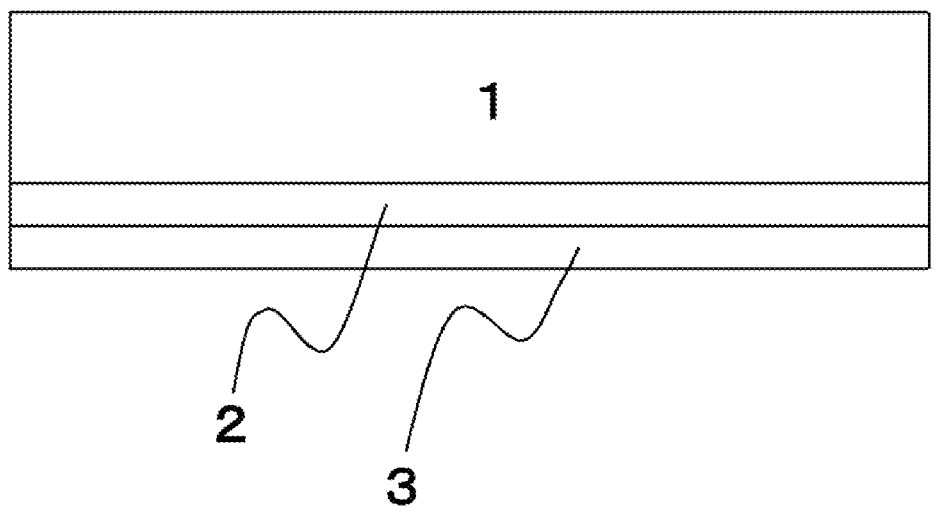
FIG. 1 is a conceptual cross-sectional diagram showing an example of the pressure-sensitive adhesive film according to an embodiment.

As used herein, the term "film" is used as a term that also encompasses a sheet. The term "resin" is used as a term that also encompasses a resin mixture containing two or more resins and a resin composition containing components other than resins. The wording "a layer is on a surface layer side of another layer" means that the relevant layer is located closer to a surface that is visible after the pressure-sensitive adhesive film is applied to the wall. The wording "laminating a layer on another layer" encompasses both directly laminating the layers on each other and laminating the layers with one or more other layers, such as an anchor coat layer, interposed therebetween. The term "or more" for a numerical range is used to mean a certain numerical value or a numerical value exceeding the certain numerical value. For example, 20% or more means 20% or a value exceeding 20%. The term "or less" for a numerical range is used to mean a certain numerical value or a numerical value less than the certain numerical value. For example, 20% or less means 20% or a value less than 20%. Further, the term "to" (or, the symbol "-") for a numerical range is used to mean a certain numerical value, a numerical value greater than the certain numerical value and less than another numerical value, or the other numerical value. Here, the other numerical value is a numerical value greater than the certain numerical value. For example, 10 to 90% means 10%, greater than 10% and less than 90%, or 90%.

In sections other than the section of Examples or unless otherwise specified, all numerical values used in the present description and claims should be understood to be modified by the term "about". Without attempting to limit the application of the doctrine of equivalents to claims, each numerical value should be interpreted in light of significant figures and by the application of the general rounding method.

The pressure-sensitive adhesive film according to at least one embodiment includes (α) a layer of a polyvinyl chloride resin film and (β) a pressure-sensitive adhesive layer in this order from a surface layer side.

(α) Layer of Polyvinyl Chloride Resin Film

According to at least one embodiment, the layer (α) is made of a polyvinyl chloride resin film. The layer (α) serves as a substrate of the pressure-sensitive adhesive film according to at least one embodiment.

Examples of the polyvinyl chloride resin used as a material of the polyvinyl chloride resin film of the layer (α) include: polyvinyl chloride (a vinyl chloride homopolymer); vinyl chloride copolymers of vinyl chloride with other monomers copolymerizable with vinyl chloride, such as a vinyl chloride-vinyl acetate copolymer, a vinyl chloride-(meth)acrylic acid copolymer, a vinyl chloride-methyl (meth)acrylate copolymer, a vinyl chloride-ethyl (meth) acrylate copolymer, a vinyl chloride-maleic acid ester copolymer, a vinyl chloride-ethylene copolymer, a vinyl chloride-propylene copolymer, a vinyl chloride-styrene copolymer, a vinyl chloride-isobutylene copolymer, a vinyl chloride-vinylidene chloride copolymer, a vinyl chloride-styrene-maleic anhydride terpolymer, a vinyl chloride-styrene-acrylonitrile terpolymer, a vinyl chloride-butadiene copolymer, a vinyl chloride-isoprene copolymer, a vinyl chloride-chlorinated propylene copolymer, a vinyl chloride-vinylidene chloride-vinyl acetate terpolymer, a vinyl chloride-acrylonitrile copolymer, and copolymers of vinyl chloride with various vinyl ethers; and resins obtained by modifying (for example, chlorinating) polyvinyl chloride or a vinyl chloride copolymer, such as a post-chlorinated vinyl copolymer. Further, a chlorinated polyolefin having a chemical structure similar to that of polyvinyl chloride, such as chlorinated polyethylene, may also be used. Such chlorinated polyolefin having a chemical structure similar to that of polyvinyl chloride is also included in the category of "polyvinyl chloride resin" that forms the layer of the polyvinyl chloride resin film (α). The polyvinyl chloride resin may be one kind or a mixture of two or more kinds of these resins.

According to at least one embodiment, the polyvinyl chloride resin may further contain other resins generally used in a polyvinyl chloride resin composition. The blend ratio of the other resins is not particularly limited unless it is contrary to the object of the various embodiments of the subject application. The blend ratio may be usually 0 to 40 mass %, preferably 0 to 30 mass %, more preferably 5 to 25 mass % based on 100 mass % in total of the polyvinyl chloride resin and the other resins.

Examples of the other resins include: an ethylene-vinyl acetate copolymer; an ethylene-(meth)acrylic acid copolymer and an ethylene-methyl (meth)acrylate copolymer; an ethylene-ethyl (meth)acrylate copolymer; and core-shell rubbers such as a methacrylic acid ester-styrene/butadiene rubber graft copolymer, an acrylonitrile-styrene/butadiene rubber graft copolymer, an acrylonitrile-styrene/ethylene-propylene rubber graft copolymer, an acrylonitrile-styrene/acrylic acid ester graft copolymer, a methacrylic acid ester/acrylic acid ester rubber graft copolymer, and a methacrylic acid ester-acrylonitrile/acrylic acid ester rubber graft copolymer. The other resins may be one kind or a mixture of two or more kinds of these resins.

According to at least one embodiment, the polyvinyl chloride resin may further contain a plasticizer generally used in a polyvinyl chloride resin composition. The amount of the plasticizer may be usually 100 parts by mass or less, preferably 10 to 30 parts by mass, more preferably 15 to 25 parts by mass based on 100 parts by mass in total of the polyvinyl chloride resin and the other resins.

Examples of the plasticizer include phthalate plasticizers, trimellitate plasticizers, pyromellitate plasticizers, adipate plasticizers, itaconate plasticizers, citrate plasticizers, cyclohexane dicarboxylate plasticizers, and epoxy plasticizers.

Examples of the plasticizer also include polyester plasticizers obtained by using polyhydric alcohols such as ethylene glycol, diethylene glycol, triethylene glycol, 1,2-propylene glycol, 1,3-propylene glycol, 1,3-butanediol, 1,4-butanediol, 1,5-hexanediol, 1,6-hexanediol, and neopentyl glycol, and polycarboxylic acids such as oxalic acid, malonic acid, succinic acid, glutaric acid, adipic acid, trimellitic acid, pimelic acid, suberic acid, maleic acid, azelaic acid, sebacic acid, fumaric acid, phthalic acid, isophthalic acid, and terephthalic acid, and optionally using a monohydric alcohol or a monocarboxylic acid as a stopper.

Examples of the phthalate plasticizers include dibutyl phthalate, butyl hexyl phthalate, diheptyl phthalate, di(2-ethylhexyl) phthalate, diisononyl phthalate, diisodecyl phthalate, diundecyl phthalate, ditridecyl phthalate, dilauryl phthalate, dicyclohexyl phthalate, and dioctyl terephthalate.

Examples of the trimellitate plasticizers include tri(2-ethylhexyl) trimellitate, tri(n-octyl) trimellitate, and tri(i-sononyl) trimellitate.

Examples of the adipate plasticizers include bis(2-ethylhexyl) adipate, dioctyl adipate, diisononyl adipate, and diisodecyl adipate.

Examples of the epoxy plasticizers include epoxidized soybean oil, epoxidized linseed oil, epoxidized fatty acid octyl esters, and epoxidized fatty acid alkyl esters.

Other examples of the plasticizer include trimellitic acid plasticizers, tetrahydrophthalic acid diester plasticizers, glycerin ester plasticizers, epoxy hexahydro phthalic acid diester plasticizers, isosorbide diester plasticizers, phosphate plasticizers, azelaic acid plasticizers, sebacic acid plasticizers, stearic acid plasticizers, citric acid plasticizers, pyromellitic acid plasticizers, biphenyl tetracarboxylate plasticizers, and chlorine plasticizers.

The plasticizer may be one kind or a mixture of two or more kinds of these plasticizers.

According to at least one embodiment, the polyvinyl chloride resin may further contain a substance(s) generally used in a polyvinyl chloride resin composition to the extent that it is not contrary to the object of the various embodiments of the subject application. Examples of optional components that may be contained in the polyvinyl chloride resin include: pigments, inorganic fillers, organic fillers, and resin fillers; and additives such as lubricants, antioxidants, weathering stabilizers, heat stabilizers, nucleating agents, mold release agents, antistatic agents, urea-formaldehyde waxes, and surfactants. The amount of the optional component(s) is usually about 0.01 to 50 parts by mass based on 100 parts by mass in total of the polyvinyl chloride resin and the other resins.

The method of obtaining the polyvinyl chloride resin film using the polyvinyl chloride resin according to various embodiments is not particularly limited. Examples of the method include a method in which an apparatus including a calender rolling mill and a winder is used, and a method in which an apparatus including an extruder, a T-die, and a winder is used.

Examples of the calender rolling mill include a vertical three rolling mill, a vertical four rolling mill, an L-shaped four rolling mill, an inverted L-shaped four rolling mill, and a Z-shaped rolling mill.

Examples of the extruder include a single-screw extruder, a co-rotating twin-screw extruder, and a counter-rotating twin-screw extruder.

Examples of the T-die include a manifold die, a fish tail die, and a coat hanger die.

According to at least one embodiment, the thickness of the polyvinyl chloride resin film (in the case where the polyvinyl chloride resin film is provided with an uneven pattern from a viewpoint of design, the thickness before the uneven pattern is formed, or the thickness at a portion where the uneven pattern is not formed) is not particularly limited, but the thickness may be usually 20 µm or more, preferably 50 µm or more, more preferably 80 µm or more from a viewpoint of handleability. Meanwhile, the thickness of the polyvinyl chloride resin film may be usually 400 µm or less, preferably 300 µm or less, more preferably 250 µm or less from a viewpoint of workability during application. In one embodiment, the thickness of the polyvinyl chloride resin film may be usually 20 µm or more and 400 µm or less, preferably 20 µm or more and 300 µm or less, 20 µm or more and 250 µm or less, 50 µm or more and 400 µm or less, 50 µm or more and 300 µm or less, 50 µm or more and 250 µm or less, 80 µm or more and 400 µm or less, 80 µm or more and 300 µm or less, or 80 µm or more and 250 µm or less.

According to at least one embodiment, the thickness of the polyvinyl chloride resin film (in the case where the polyvinyl chloride resin film is provided with an uneven pattern from a viewpoint of design, the thickness before the uneven pattern is formed, or the thickness at a portion where the uneven pattern is not formed) is substantially uniform throughout the film. The wording "substantially uniform thickness" as used herein refers to a thickness having a variation within the range of about −5 to +5 µm, which is a range of variation in process and quality control that is generally carried out industrially. For example, in the case where the thickness of the polyvinyl chloride resin film to be produced is set to 160 µm, if the thickness of the film at one position is 155 µm and the thickness of the film at another position is 165 µm, that is, the thickness varies by a maximum of −5 to +5 µm, it can be said that the polyvinyl chloride resin film has a substantially uniform thickness of 160 µm.

As for the polyvinyl chloride resin film, the yield point stress, which is measured in accordance with JIS K 7127: 1999 using a test piece type 1B obtained by punching the film so that the machine direction of the film is the tensile direction under the conditions of a temperature of 5° C. and a tensile speed of 200 mm/min, may be usually 45 MPa or less, preferably 40 MPa or less, more preferably 39 MPa or less, still more preferably 38 MPa or less, most preferably 37 MPa or less from a viewpoint of low-temperature applicability. Meanwhile, the yield point stress may be preferably 25 MPa or more, more preferably 30 MPa or more, still more preferably 32 MPa or more, most preferably 33 MPa or more from a viewpoint of high-temperature applicability. In one embodiment, the yield point stress may be preferably 25 MPa or more and 45 MPa or less, more preferably 25 MPa or more and 40 MPa or less, 25 MPa or more and 39 MPa or less, 25 MPa or more and 38 MPa or less, 25 MPa or more and 37 MPa or less, 30 MPa or more and 45 MPa or less, 30 MPa or more and 40 MPa or less, 30 MPa or more and 39 MPa or less, 30 MPa or more and 38 MPa or less, 30 MPa or more and 37 MPa or less, 32 MPa or more and 45 MPa or less, 32 MPa or more and 40 MPa or less, 32 MPa or more and 39 MPa or less, 32 MPa or more and 38 MPa or less, 32 MPa or more and 37 MPa or less, 33 MPa or more and 45 MPa or less, 33 MPa or more and 40 MPa or less, 33 MPa or more and 39 MPa or less, 33 MPa or more and 38 MPa or less, or 33 MPa or more and 37 MPa or less.

On a surface of the polyvinyl chloride resin film opposite to a surface thereof on which the pressure-sensitive adhesive layer (β) is formed (i.e., a surface that is visible after the pressure-sensitive adhesive film is applied to the wall), an optional layer such as a printed layer may be provided if desired. On the optional layer, additional optional layers such as a transparent resin film layer and a protective coat layer may be further provided.

(β) Pressure-Sensitive Adhesive Layer

According to at least one embodiment, the layer (β) is a layer formed from a pressure-sensitive adhesive. In one embodiment, the pressure-sensitive adhesive that forms the layer (β) contains: (A) 100 parts by mass of an acrylic polymer that satisfies properties (a1) and (a2) shown below; and (B) 0.1 to 3 parts by mass of a compound having two or more isocyanate groups per molecule. Here, the properties (a1) and (a2) that are satisfied by the acrylic polymer as component (A) are as follows: (a1) an acid value of 18 to 27 mg KOH/g; and (a2) a mass-average molecular weight of 500,000 to 1,000,000

Component (A) is an acrylic polymer. The acrylic polymer as component (A) exhibits pressure-sensitive adhesiveness as a base agent of the pressure-sensitive adhesive, and serves to enclose the compound having two or more isocyanate groups per molecule as component (B) and other optional component(s).

The acid value of the acrylic polymer as component (A) is usually 27 mg KOH/g or less, preferably 26 mg KOH/g or less, more preferably 25 mg KOH/g or less from a viewpoint of increasing the tackiness at a temperature of 5° C. Meanwhile, the acid value of the acrylic polymer as component (A) is usually 18 mg KOH/g or more, preferably 20 mg KOH/g or more, more preferably 22 mg KOH/g or more from viewpoints of initial pressure-sensitive adhesive force, prevention of peeling, prevention of curling, and prevention of gap occurrence. In one embodiment, the acid value of the acrylic polymer as component (A) may be usually 18 mg KOH/g or more and 27 mg KOH/g or less, preferably 18 mg KOH/g or more and 26 mg KOH/g or less, 18 mg KOH/g or more and 25 mg KOH/g or less, 20 mg KOH/g or more and 27 mg KOH/g or less, 20 mg KOH/g or more and 26 mg KOH/g or less, 20 mg KOH/g or more and 25 mg KOH/g or less, 22 mg KOH/g or more and 27 mg KOH/g or less, 22 mg KOH/g or more and 26 mg KOH/g or less, or 22 mg KOH/g or more and 25 mg KOH/g or less.

Here, the acid value is the number of milligrams of potassium hydroxide required to neutralize free fatty acids, resin acids, and the like contained in 1 g of a sample, and is a value measured in accordance with JIS K 0070-1992, 3.1 neutralization titration method.

The mass-average molecular weight of the acrylic polymer as component (A) may be usually 500,000 or more, preferably 550,000 or more from viewpoints of imparting adequate hardness to the pressure-sensitive adhesive and preventing peeling, curling, and gap occurrence. Meanwhile, the mass-average molecular weight of the acrylic polymer as component (A) may be usually 1,000,000 or less, preferably 800,000 or less from a viewpoint of coatability. In one embodiment, the mass-average molecular weight of the acrylic polymer as component (A) may be usually 500,000 or more and 1,000,000 or less, preferably 500,000 or more and 800,000 or less, 550,000 or more and 1,000,000 or less, or 550,000 or more and 800,000 or less.

Here, the mass-average molecular weight was determined using gel permeation chromatography (GPC). The GPC measurement was carried out using a high-performance liquid chromatography system "SHODEX GPC-101" (trade name) available from Showa Denko K.K. and polystyrene columns (one column with an exclusion limit of $4 \times 10^8$ and one column with an exclusion limit of $1 \times 10^4$ connected together) under the conditions of a measurement temperature of 40° C., a flow rate of 1 mL/min, tetrahydrofuran (THF) for high-performance liquid chromatography as a mobile phase, and a sample concentration of 1 mg/mL. The molecular weight calibration curve was obtained using standard polystyrene.

Those skilled in the art will understand that substantially the same mass-average molecular weight can be obtained also by using a high-performance liquid chromatography system other than that specified above with the specific trade name.

According to at least one embodiment, the glass transition temperature of the acrylic polymer as component (A) may be preferably −50° C. or less, more preferably −55° C. or less from a viewpoint of improving workability during low-temperature application, although it depends on the type and the amount of the compound having two or more isocyanate groups per molecule as component (B). Meanwhile, the glass transition temperature of the acrylic polymer as component (A) may be preferably −70° C. or more, more preferably −60° C. or more from viewpoints of maintaining pressure-sensitive adhesive force at high temperatures and preventing peeling, curling, and gap occurrence. In one embodiment, the glass transition temperature of the acrylic polymer as component (A) may be preferably −70° C. or more and −50° C. less, more preferably −70° C. or more and −55° C. or less, −60° C. or more and −50° C. or less, or −60° C. or more and −55° C. or less.

Here, the glass transition temperature of the acrylic polymer as component (A) is a calculated value by an ordinary method, that is, a value obtained from the following formula (Fox formula).

$$1/(Tg+273) = W_1/(Tg_1+273) + W_2/(Tg_2+273) + W_3/(Tg_3+273) + \ldots + W_n/(Tg_n+273)$$

In the formula, Tg is the glass transition temperature (° C.) of a polymer composed of n kinds of monomers, $W_1$, $W_2$, $W_3$ ... and $W_n$ are each the mass % of each monomer in a monomer composition, and $Tg_1$, $Tg_2$, $Tg_3$ ... and $Tg_n$ are each the glass transition temperature (° C.) of a homopolymer of each monomer. For the Tg of each homopolymer, for example, a numerical value described in the Polymer Handbook can be used.

According to at least one embodiment, the acrylic polymer as component (A) is not limited except that it satisfies the properties (a1) and (a2) and that it preferably has a glass transition temperature of −70° C. to −50° C., and any acrylic polymer can be used. Examples of the acrylic polymer include polymers and copolymers each comprised of, as monomers, one kind or a mixture of two or more kinds of the following: (meth)acrylic acid ester monomers such as methyl (meth)acrylate, ethyl (meth)acrylate, propyl (meth)acrylate, butyl (meth)acrylate, pentyl (meth)acrylate, hexyl (meth)acrylate, cyclohexyl (meth)acrylate, 2-ethylhexyl (meth)acrylate, isooctyl (meth)acrylate, decyl (meth)acrylate, dodecyl (meth)acrylate, myristyl (meth)acrylate, palmityl (meth)acrylate, and stearyl (meth)acrylate; carboxyl group-containing monomers such as acrylic acid, methacrylic acid, itaconic acid, and β-carboxyethyl (meth)acrylate; epoxy group-containing monomers such as glycidyl (meth)acrylate and 4-hydroxybuthyl (meth)acrylate glycidyl ether; and hydroxyl group-containing (meth)acrylic acid ester monomers such as 2-hydroxyethyl (meth)acrylate, 2-hydroxypropyl (meth)acrylate, 3-hydroxypropyl (meth)acrylate, 2-hydroxybutyl (meth)acrylate, 3-hydroxybutyl (meth)acrylate, and 4-hydroxybutyl (meth)acrylate. The term "(meth)acrylic acid" means an acrylic acid or a methacrylic acid. The term "(meth)acrylate" means an acrylate or a methacrylate. The acrylic polymer as component (A) may be one kind or a mixture of two or more kinds of these polymers.

Component (B) is a compound having two or more isocyanate groups (—N=C=O) per molecule. The compound having two or more isocyanate groups per molecule as component (B) imparts adequate hardness to the pressure-sensitive adhesive, and serves to prevent peeling, curling, and gap occurrence.

Examples of the compound having two or more isocyanate groups per molecule include: methylene bis-4-cyclohexyl isocyanate; polyisocyanates such as a trimethylolpropane adduct of tolylene diisocyanate, a trimethylolpropane adduct of hexamethylene diisocyanate, a trimethylolpropane adduct of isophorone diisocyanate, an isocyanurate of tolylene diisocyanate, an isocyanurate of hexamethylene diisocyanate, an isocyanurate of isophorone diisocyanate, and a biuret of hexamethylene diisocyanate; and urethane crosslinking agents such as blocked isocyanates of the above-mentioned polyisocyanates. The compound having two or more isocyanate groups per molecule may be one kind or a mixture of two or more kinds of these compounds.

In the crosslinking, a catalyst such as dibutyltin dilaurate or dibutyltin diethylhexoate may be added as necessary.

According to at least one embodiment, the amount of the compound having two or more isocyanate groups per molecule as component (B) is usually 0.1 part by mass or more, preferably 0.5 parts by mass or more, more preferably 1 part by mass or more based on 100 parts by mass of the acrylic polymer as component (A) from viewpoints of imparting adequate hardness to the pressure-sensitive adhesive and preventing peeling, curling, and gap occurrence. Meanwhile, the amount of the compound having two or more isocyanate groups per molecule as component (B) is usually 3 parts by mass or less, preferably 2 parts by mass or less, more preferably 1.6 parts by mass or less from a viewpoint of maintaining the pressure-sensitive adhesive force at low temperatures. In one embodiment, the amount of the compound having two or more isocyanate groups per molecule as component (B) may be usually 0.1 part by mass or more and 3 parts by mass or less, preferably 0.1 part by mass or more and 2 parts by mass or less, 0.1 part by mass or more and 1.6 parts by mass or less, 0.5 parts by mass or more and 3 parts by mass or less, 0.5 parts by mass or more and 2 parts by mass or less, 0.5 parts by mass or more and 1.6 parts by mass or less, 1 part by mass or more and 3 parts by mass or less, 1 part by mass or more and 2 parts by mass or less, or 1 part by mass or more and 1.6 parts by mass or less.

According to at least one embodiment, the pressure-sensitive adhesive used for forming the layer (β) may contain a solvent if desired in order to dilute the pressure-sensitive adhesive to a concentration at which the coating operation is facilitated. The solvent is not particularly limited as long as it does not react with other components of the pressure-sensitive adhesive or catalyze (promote) the self-reaction (including a deterioration reaction) of these components. Examples of the solvent include 1-methoxy-2-propanol, isopropanol, ethyl acetate, n-butyl acetate, toluene, methyl ethyl ketone, methyl isobutyl ketone, diacetone alcohol, and acetone. The solvent may be one kind or a mixture of two or more kinds of these solvents.

According to at least one embodiment, the pressure-sensitive adhesive used for forming the layer (β) may further contain, if desired, an optional component(s) other than components (A) and (B) to the extent that it is not contrary to the object of the present invention. Examples of the optional component(s) include additives such as flame retardants, photopolymerization initiators, antistatic agents, surfactants, leveling agents, thixotropy-imparting agents, antifouling agents, printability improvers, antioxidants, weather resistance stabilizers, light resistance stabilizers, ultraviolet absorbers, heat stabilizers, pigments, or fillers. The amount of the optional component(s) is not particularly limited, but may be usually about 0.01 to 10 parts by mass based on 100 parts by mass of component (A).

According to at least one embodiment, the pressure-sensitive adhesive used for forming the layer (β) can be obtained by mixing and stirring these components.

According to at least one embodiment, the gel fraction of the pressure-sensitive adhesive used for forming the layer (β) may be preferably 30 mass % or more, more preferably 45 mass % or more from viewpoints of imparting adequate hardness to the pressure-sensitive adhesive and preventing peeling, curling, and gap occurrence. Meanwhile, the gel fraction of the pressure-sensitive adhesive may be preferably 75 mass % or less, more preferably 70 mass % or less from viewpoints of balance of properties between the pressure-sensitive adhesive force and the cohesive force as well as tackiness. In one embodiment, the gel fraction of the pressure-sensitive adhesive may be preferably 30 mass % or more and 75 mass % or less, more preferably 30 mass % or more and 70 mass % or less, 45 mass % or more and 75 mass % or less, or 45 mass % or more and 70 mass % or less.

Herein, the gel fraction of the pressure-sensitive adhesive is calculated according to the following formula after the following operation: the mass of a filter mesh "T-NO355T" (trade name) available from NBC Meshtec Inc. is measured, 0.1 g of the pressure-sensitive adhesive is put in the filter mesh, the mass of the filter mesh containing the pressure-sensitive adhesive before ethyl acetate extraction is measured, the filter mesh is charged into a lidded glass bottle containing 100 ml of ethyl acetate (special grade), the glass bottle with the lid closed is left standing still for 4 days at ordinary temperature (25° C.), the filter mesh is air-dried at 135° C. for 1 hour, and the mass of the filter mesh containing the pressure-sensitive adhesive after ethyl acetate extraction is measured.

$$\text{Gel fraction (\%)} = (W_C - W_B)/(W_B - W_A) \times 100$$

In the formula, $W_A$ is the mass of the filter mesh, $W_B$ is the mass of the filter mesh containing the pressure-sensitive adhesive before ethyl acetate extraction, and $W_C$ is the mass of the filter mesh containing the pressure-sensitive adhesive after ethyl acetate extraction.

Those skilled in the art will understand that substantially the same gel fraction can be obtained also by using a filter mesh other than that specified above with the specific trade name.

The peak top value of tan δ on the lowest temperature side of the pressure-sensitive adhesive used for forming the layer (β) may be preferably −5° C. or less, more preferably −10° C. or less from a viewpoint of improving workability during application. Meanwhile, the peak top value of tan δ on the lowest temperature side of the pressure-sensitive adhesive may be preferably −20° C. or more, more preferably −15° C. or more from viewpoints of maintaining the pressure-sensitive adhesive force at high temperatures and preventing peeling, curling, and gap occurrence. In one embodiment, the peak top value of tan δ on the lowest temperature side of the pressure-sensitive adhesive may be preferably −20° C. or more and −5° C. or less, more preferably −20° C. or more and −10° C. or less, −15° C. or more and −5° C. or less, or −15° C. or more and −10° C. or less.

Herein, the peak top value of tan δ on the lowest temperature side of the pressure-sensitive adhesive is a peak top temperature of a peak appearing on the lowest temperature side of a temperature-tan δ curve obtained by using a dynamic viscoelasticity measuring device "EXSTAR 6100DMS" (trade name) available from Seiko Instruments Inc. according to the following operation: a disk-shaped sample having a diameter of 5 mm and a thickness of 1 mm punched out of a 1-mm thick sheet is placed on each of both tips of a shear chuck and set up using a shear clamp base, the samples are held at a temperature of −45° C. for 10 minutes, and then the temperature is raised to 100° C. under the conditions of a temperature rise rate of 3° C./min and a frequency of 0.1 Hz. The 1-mm thick sheet was produced by scraping the pressure-sensitive adhesive from the pressure-sensitive adhesive film, adding 150 parts by mass of a solvent (a 2:1 (volume ratio) mixed solvent of ethyl acetate and butyl acetate) to 100 parts by mass of the scraped pressure-sensitive adhesive and dissolving the pressure-sensitive adhesive well, pouring the resulting solution into a flat mold so that the solution may have a dried thickness of 1 mm, leaving the solution still to dry the solution at room temperature (23° C.) for 24 hours, and further vacuum-drying the solution at a temperature of 30° C. for 8 hours.

Those skilled in the art will understand that substantially the same peak top value of tan δ on the lowest temperature side can be obtained also by using a dynamic viscoelasticity measuring device other than that specified above with the specific trade name.

According to at least one embodiment, the method of forming the layer (β) using the pressure-sensitive adhesive is not particularly limited, and a known web coating method can be used. Examples of the method include roll coating, gravure coating, reverse coating, roll brushing, spray coating, air knife coating, and die coating. The layer (β) may be formed directly on a surface of the layer (α) on which the layer (β) is to be formed. Alternatively, the layer (β) may be formed on a release surface of release paper and transferred onto the surface of the layer (α) on which the layer (β) is to be formed.

According to at least one embodiment, the thickness of the layer (β) (in an aspect in which an air vent groove described later is provided, the thickness at a portion other than the groove) is not particularly limited, but the thickness may be usually 10 μm or more, preferably 30 μm or more, more preferably 40 μm or more from a viewpoint of workability during application. Meanwhile, the thickness of the layer (β) may be usually 75 μm or less, preferably 55 μm or less, more preferably 50 μm or less from a viewpoint of good balance of desired characteristics between appearance defect prevention and initial pressure-sensitive adhesive force in the aspect in which an air vent groove is provided in the bonding surface. In one embodiment, the thickness of the layer (β) may be usually 10 μm or more and 75 μm or less, preferably 10 μm or more and 55 μm or less, 10 μm or more and 50 μm or less, 30 μm or more and 75 μm or less, 30 μm or more and 55 μm or less, 30 μm or more and 50 μm or less, 40 μm or more and 75 μm or less, 40 μm or more and 55 μm or less, or 40 μm or more and 50 μm or less.

According to at least one embodiment, the thickness of the layer (β) is substantially uniform throughout the layer. The wording "substantially uniform thickness" as used herein refers to a thickness having a variation within the range of about −2 to +2 μm, which is a range of variation in process and quality control that is generally carried out industrially. For example, in the case where the thickness of the layer (β) to be produced is set to 45 μm, if the thickness of the layer at one position is 43 μm and the thickness of the layer at another position is 47 μm, that is, the thickness varies by a maximum of −2 to +2 μm, it can be said that the layer (β) has a substantially uniform thickness of 45 μm.

According to at least one embodiment, the tackiness of the surface of the pressure-sensitive adhesive layer (β) at a temperature of 5° C. is preferably 12 N or more, more preferably 15 N or more, still more preferably 17 N or more from a viewpoint of solving the problem of temporal blistering after low-temperature application. Meanwhile, the tackiness of the surface of the pressure-sensitive adhesive layer (β) at a temperature of 5° C. may be preferably 25 N or less, more preferably 23 N or less from a viewpoint of good balance between solving the problem of temporal blistering after low-temperature application and suppressing stickiness at high temperatures. In one embodiment, the tackiness of the surface of the pressure-sensitive adhesive layer (β) at a temperature of 5° C. may be preferably 12 N or more and 25 N or less, more preferably 12 N or more and 23 N or less, 15 N or more and 25 N or less, 15 N or more and 23 N or less, 17 N or more and 25 N or less, or 17 N or more and 23 N or less.

According to at least one embodiment, the tackiness of the surface of the pressure-sensitive adhesive layer (β) at a temperature of 35° C. may be preferably 12 N or more, more preferably 15 N or more from a viewpoint of application workability. Meanwhile, the tackiness of the surface of the pressure-sensitive adhesive layer (β) at a temperature of 35° C. may be preferably 23 N or less, more preferably 20 N or less from a viewpoint of suppressing stickiness at high temperatures. In one embodiment, the tackiness of the surface of the pressure-sensitive adhesive layer (β) at a temperature of 35° C. may be preferably 12 N or more and 23 N or less, more preferably 12 N or more and 20 N or less, 15 N or more and 23 N or less, or 15 N or more and 20 N or less.

Herein, the tackiness at a temperature of 5° C. is a value measured according to the following operation: after the pressure-sensitive adhesive film is conditioned in an environment of a temperature of 5° C. and 50% relative humidity for 24 hours or more, the tackiness is measured in the same environment using a tackiness checker (model HTC-1) available from Toyo Seiki Seisaku-sho, Ltd. with the type of a contact being a flat surface indenter (model AL-M1) under the conditions of a contact press force of 5 N, a press time of 3 seconds, and a number of repetition of tests of 5 times. The tackiness at a temperature of 35° C. is a value measured in the same manner as that for the tackiness at a temperature of 5° C. according to the following operation: after the pressure-sensitive adhesive film is conditioned in an environment of a temperature of 35° C. and 50% relative humidity for 24 hours or more, the tackiness is measured in the same environment. In a later-described aspect in which an air vent groove is provided, the measured value is used as it is without considering the presence of the groove.

Those skilled in the art will understand that substantially the same tackiness can be obtained also by using a tackiness checker other than that specified above with the specific trade name.

In the case where a pressure-sensitive adhesive film is applied in the cold winter season, although the pressure-sensitive adhesive film seems to be successfully applied immediately after the application, the pressure-sensitive adhesive film may be blistered when the temperature of the room rises or when the pressure-sensitive adhesive film is exposed to sunlight coming in through the window after the application. Although not wishing to be bound by any theory, this problem is probably caused by the following phenomenon: in the case where a pressure-sensitive adhesive film is applied in the cold winter season, due to the low tack force, there is a portion where the surface of the wall and the surface of the pressure-sensitive adhesive layer are not closely attached to each other, that is, a portion where a small amount of air is caught without causing any appearance defects, and the caught air expands due to a rise of the room temperature or the like. Therefore, it is considered that one of the reasons why the present invention can solve the above-mentioned problem would be that the tack force of the pressure-sensitive adhesive at low temperatures is increased.

It is preferable to provide at least one air vent groove in the surface of the layer (β) to be bonded to the wall or the like. Appearance defects such as blistering and wrinkles, which can be recognized immediately after application, can be prevented or suppressed by the air vent groove. The shape of the air vent groove and the method for providing the air vent groove may be a known shape and a known method described, for example, in JP-A-2006-070273, JP-A-2002-544364, and International Publication WO 2005/100499.

FIG. 1 is a conceptual cross-sectional diagram showing an example of the pressure-sensitive adhesive film according to an embodiment. The pressure-sensitive adhesive film includes a layer 1 of a polyvinyl chloride resin film and a pressure-sensitive adhesive layer 2, and a release paper is laminated on a surface of the pressure-sensitive adhesive film on the side of the pressure-sensitive adhesive layer 2 from a viewpoint of handleability until the pressure-sensitive adhesive film is applied.

EXAMPLES

The various embodiments will be described below with reference to examples, but the various embodiments are not limited thereto.

Methods for Measurement and Evaluation of Physical Properties (i) Tackiness at Temperature of 5° C.

According to at least one embodiment, the tackiness (unit: N) of a surface of a pressure-sensitive adhesive film on the side of a pressure-sensitive adhesive layer was measured according to the following operation: after the pressure-sensitive adhesive film is conditioned in an environment of a temperature of 5° C. and 50% relative humidity for 24 hours or more, the tackiness is measured in the same environment using a tackiness checker (model HTC-1) available from Toyo Seiki Seisaku-sho, Ltd. with the type of a contact being a flat surface indenter (model AL-M1) under the conditions of a contact press force of 5 N, a press time of 3 seconds, and a number of repetition of tests of 5 times. The results listed in the following table are average values of 5 tests.

(ii) Tackiness at Temperature of 35° C.

According to at least one embodiment, the tackiness (unit: N) was measured in the same manner as in the test (i) according to the following operation: after the pressure-sensitive adhesive film is conditioned in an environment of a temperature of 35° C. and 50% relative humidity for 24 hours or more, the tackiness is measured in the same environment.

(iii) Temporal Blistering after Low-Temperature Application (Acceleration Test)

Figure 2:
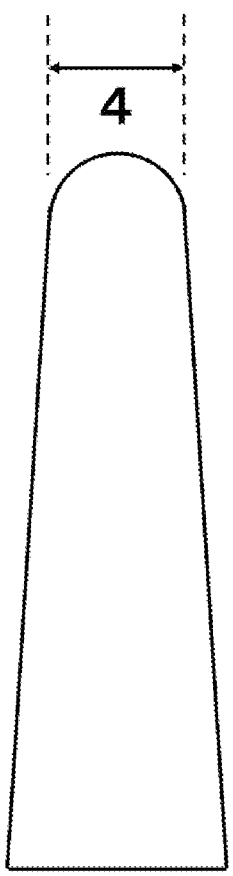
FIG. 2 is a conceptual cross-sectional diagram of a squeegee used in the examples.

A 12.5-mm thick gypsum board "Tiger Board" (trade name) available from Yoshino Gypsum Co., Ltd. was subjected to a surface treatment of applying a rubber primer "BENRIDAIN NEW RT" (trade name) available from Sangetsu Corporation using a sponge roller and drying the primer. Then, the treated gypsum board obtained as described above and a pressure-sensitive adhesive film were conditioned in an environment of a temperature of 5° C. and 50% relative humidity for 24 hours or more, and then the pressure-sensitive adhesive film was pressure-bonded to the treated surface of the gypsum board by the application of a load of 150 to 230 gf using a squeegee having an edge width of 1.5 mm and a width of 10 cm (FIG. 2 shows a conceptual cross-sectional diagram of the squeegee). Then, a surface of the treated gypsum board to which the pressure-sensitive adhesive film had been pressure-bonded was blown and heated from the side of the pressure-sensitive adhesive film from a position 5 cm away from the pressure-sensitive adhesive film using a 1200 W household dryer until the temperature of the whole pressure-sensitive adhesive film surface reached 40° C. The surface of the pressure-sensitive adhesive film was visually observed and evaluated according to the following criteria.

Rank 6: No blistering occurred.

Rank 5: Slight blistering occurred. The area of the blistered portion was less than 5% of the whole area.

Rank 4: A little blistering occurred. The area of the blistered portion was 5% or more and less than 15% of the whole area.

Rank 3: Not much blistering occurred. The area of the blistered portion was 15% or more and less than 25% of the whole area.

Rank 2: Much blistering occurred. The area of the blistered portion was 25% or more and less than 40% of the whole area.

Rank 1: Very much blistering occurred. The area of the blistered portion was 40% or more of the whole area.

(iv) Low-Temperature Pressure-Sensitive Adhesive Force (Pressure-Sensitive Adhesive Force Immediately after Low-Temperature Application)

The 90° peel pressure-sensitive adhesive force (unit: N/25 mm) was measured in accordance with JIS Z 0237:2009, 10 pressure-sensitive adhesive force except that a treated gypsum board obtained in the same manner as in the test (iii) was used as a test board, and the pressure-sensitive adhesive force was measured under the condition of a temperature of 5° C. with the treated surface being the surface to which the pressure-sensitive adhesive film is bonded.

(v) Low-Temperature Bending Property

An aluminum frame "Aluminum Frame for Brackets—For Thick Brackets" (trade name) available from Misumi Corporation and a pressure-sensitive adhesive film were conditioned in an environment of a temperature of 5° C. and 50% humidity for 24 hours or more, and then the pressure-sensitive adhesive film was pressure-bonded to a 90° bent portion (having a curvature of 0.2 R) of the aluminum frame using the above-mentioned squeegee and fingers. The applicability in this process was evaluated according to the following criteria.

Rank 5: The pressure-sensitive adhesive film can be easily and satisfactorily pressure-bonded to the aluminum frame.

Rank 4: The pressure-sensitive adhesive film can be satisfactorily pressure-bonded to the aluminum frame.

Rank 3: The pressure-sensitive adhesive film can be satisfactorily pressure-bonded to the aluminum frame by sufficiently smoothing.

Rank 2: Even if being sufficiently smoothed, the pressure-sensitive adhesive film is slightly lifted at the 90° bent portion of the aluminum frame and vicinity thereof.

Rank 1: Even if being sufficiently smoothed, the pressure-sensitive adhesive film is lifted at the 90° bent portion of the aluminum frame and in the vicinity thereof.

Raw Materials Used (α) Polyvinyl Chloride Resin Film (α-1) A 160-μm thick white film made from a resin composition containing 95 parts by mass of a vinyl chloride homopolymer having a degree of polymerization of 800, 5 parts by mass of an acrylic core-shell rubber (a methacrylic acid ester-styrene/acrylic acid ester rubber graft copolymer) "METABLEN W-300 Å" (trade name) available from Mitsubishi Chemical Corporation, and 20 parts by mass of a phthalate plasticizer (dinormal octyl phthalate): yield point stress: 36.2 MPa (α-2) A 160-μm thick white film made from a resin composition containing 95 parts by mass of a vinyl chloride homopolymer having a degree of polymerization of 800, 5 parts by mass of an acrylic core-shell rubber (a methacrylic acid ester-styrene/acrylic acid ester rubber graft copolymer) "METABLEN W-300 Å" (trade name) available from Mitsubishi Chemical Corporation, and 22 parts by mass of a phthalate plasticizer (dinormal octyl phthalate): yield point stress: 33.2 MPa (α-3) A 160-μm thick white film made from a resin composition containing 95 parts by mass of a vinyl chloride homopolymer having a degree of polymerization of 800, 5 parts by mass of an acrylic core-shell rubber (a methacrylic acid ester-styrene/acrylic acid ester rubber graft copolymer) "METABLEN W-300 Å" (trade name) available from Mitsubishi Chemical Corporation, and 25 parts by mass of a phthalate plasticizer (dinormal octyl phthalate): yield point stress: 31.4 MPa (α-4) A 160-μm thick white film made from a resin composition containing 95 parts by mass of a vinyl chloride homopolymer having a degree of polymerization of 800, 5 parts by mass of an acrylic core-shell rubber (a methacrylic acid ester-styrene/acrylic acid ester rubber graft copolymer) "METABLEN W-300A" (trade name) available from Mitsubishi Chemical Corporation, and 17 parts by mass of a phthalate plasticizer (dinormal octyl phthalate): yield point stress: 39.6 MPa (A) Acrylic Polymer (A-1) An acrylic polymer having an acid value of 23.3 mg KOH/g, a mass-average molecular weight of 800,000, and a glass transition temperature of −58° C. (comprised of constituent units derived from acrylic acid, butyl acrylate, and a hydroxyl group-containing acrylic monomer)

(A-2) An acrylic polymer having an acid value of 23.3 mg KOH/g, a mass-average molecular weight of 600,000, and a glass transition temperature of −58° C. (comprised of constituent units derived from acrylic acid, butyl acrylate, and a hydroxyl group-containing acrylic monomer)

(A-3) An acrylic polymer having an acid value of 26.8 mg KOH/g, a mass-average molecular weight of 500,000, and a glass transition temperature of −53° C. (comprised of constituent units derived from acrylic acid, butyl acrylate, and a hydroxyl group-containing acrylic monomer.

(A-4) An acrylic polymer having an acid value of 30.1 mg KOH/g, a mass-average molecular weight of 450,000, and a glass transition temperature of −56° C. (comprised of constituent units derived from acrylic acid, butyl acrylate, and a hydroxyl group-containing acrylic monomer)

(B) Compound Having Two or More Isocyanate Groups Per Molecule (B-1) A trimethylolpropane adduct of tolylene diisocyanate "Coronate L" (trade name) available from Tosoh Corporation was used. The amounts in terms of solid content are shown in the table.

(C) Optional Components (C-1) A brominated flame retardant "SAYTEX 8010" (trade name) available from Albemarle Corporation (C-2) Diantimony trioxide "PATOX-M" (trade name) available from Nihon Seiko Co., Ltd.

(C-3) Ethyl acetate

Example 1

Figure 3:
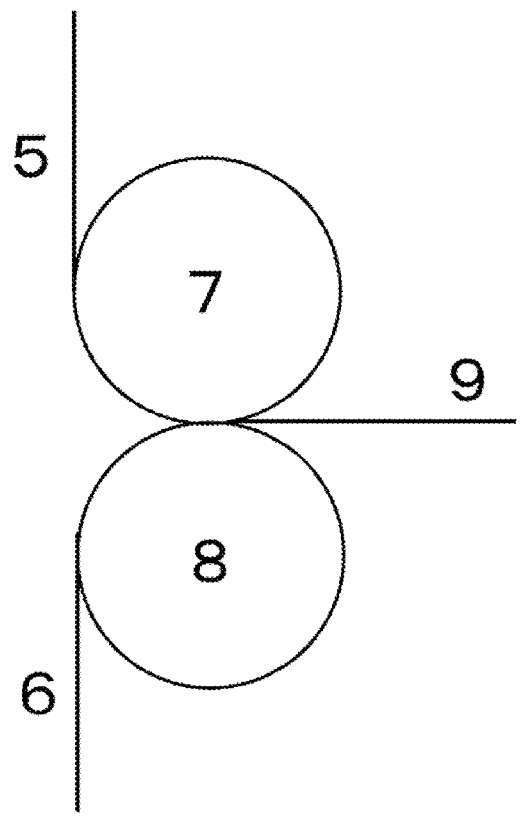
FIG. 3 is a conceptual diagram of a lamination device used in the examples.
Figure 4:
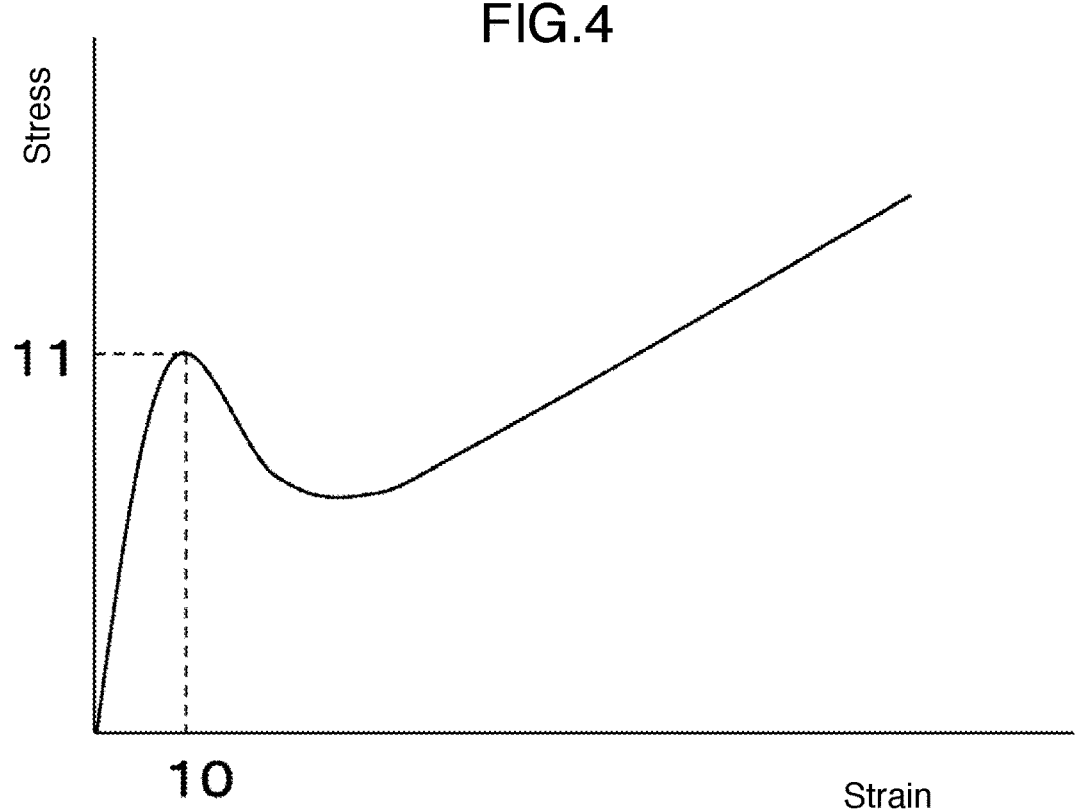
FIG. 4 is a conceptual graph for illustrating yield point stress.

The component (A-1) (100 parts by mass), the component (B-1) (1.22 parts by mass in terms of solid content), the component (C-1) (22.5 parts by mass), the component (C-2) (7.5 parts by mass), and the component (C-3) (69 parts by mass) were mixed and stirred to give a pressure-sensitive adhesive. Then, using a roll coater, the pressure-sensitive adhesive obtained as described above was applied to the release surface of release paper so that the resulting pressure-sensitive adhesive layer may have a dried thickness of 45 μm, and dried in a drying furnace to form a pressure-sensitive adhesive layer. Then, using a device shown in the conceptual diagram in FIG. 3, a laminate 5 of the release paper and the pressure-sensitive adhesive layer obtained as described above, and the (α-1) polyvinyl chloride resin film 6 were laminated using a rotating metal laminating roller 7 and a rotating pressure roller 8 that had been preheated to 30° C. so that the pressure-sensitive adhesive layer of the laminate 5 could face the (α-1) polyvinyl chloride resin film 6 and the laminate 5 could face the metal laminating roller 7, and the resulting laminate was pressurized to give a pressure-sensitive adhesive film 9 having the release paper attached thereto. The release paper was removed from the pressure-sensitive adhesive film 9, and the above-mentioned tests (i) to (v) were conducted for the pressure-sensitive adhesive film 9 without the release paper. The results are shown in Table 1. In the table, the polyvinyl chloride resin film is represented as PVC film, and the temporal blistering after low-temperature application is represented as temporal blistering.

Examples 2 to 7

Each pressure-sensitive adhesive film was produced and subjected to the measurement and evaluation tests for physical properties in the same manner as in Example 1 except that the amount of the pressure-sensitive adhesive (part by mass) was changed as shown in Table 1. The results are shown in Table 1.

Examples 8 to 10

Each pressure-sensitive adhesive film was produced and subjected to the measurement and evaluation tests for physical properties in the same manner as in Example 1 except that the polyvinyl chloride resin film was changed from (α-1) to the one shown in Table 1. The results are shown in Table 1.

TABLE 1

| | | Ex. 1 | Ex. 2 | Ex. 3 | Ex. 4 | Ex. 5 | Ex. 6 | Ex. 7 | Ex. 8 | Ex. 9 | Ex. 10 |
|---|---|---|---|---|---|---|---|---|---|---|---|
| Formulation of pressure-sensitive adhesive (part by mass) | (A-1) | 100 | 100 | — | — | — | 100 | 100 | 100 | 100 | 100 |
| | (A-2) | — | — | 100 | — | — | — | — | — | — | — |
| | (A-3) | — | — | — | 100 | — | — | — | — | — | — |
| | (A-4) | — | — | — | — | 100 | — | — | — | — | — |
| | (B-1) | 1.22 | 1.59 | 1.22 | 1.22 | 1.22 | 0.85 | 1.70 | 1.22 | 1.22 | 1.22 |
| | (C-1) | 22.5 | 22.5 | 22.5 | 22.5 | 22.5 | 22.5 | 22.5 | 22.5 | 22.5 | 22.5 |
| | (C-2) | 7.5 | 7.5 | 7.5 | 7.5 | 7.5 | 7.5 | 7.5 | 7.5 | 7.5 | 7.5 |
| | (C-3) | 69 | 69 | 69 | 69 | 69 | 69 | 69 | 69 | 69 | 69 |
| Component A | Acid value mgKOH/g | 23.3 | 23.3 | 23.3 | 26.8 | 30.1 | 23.3 | 23.3 | 23.3 | 23.3 | 23.3 |
| | Mass-average molecular weight | $8*10^5$ | $8*10^5$ | $6*10^5$ | $5*10^5$ | $4.5*10^5$ | $8*10^5$ | $8*10^5$ | $8*10^5$ | $8*10^5$ | $8*10^5$ |
| | Glass transition temperature ° C. | −58 | −58 | −58 | −53 | −56 | −58 | −58 | −58 | −58 | −58 |
| | PVC film | α-1 | α-1 | α-1 | α-1 | α-1 | α-1 | α-1 | α-2 | α-3 | α-4 |

TABLE 1-continued

| | | Ex. 1 | Ex. 2 | Ex. 3 | Ex. 4 | Ex. 5 | Ex. 6 | Ex. 7 | Ex. 8 | Ex. 9 | Ex. 10 |
|---|---|---|---|---|---|---|---|---|---|---|---|
| Evaluation results | Gel fraction mass % | 50.5 | 56.9 | 47.0 | 40.0 | 37.5 | 45.5 | 63.5 | 50.5 | 50.5 | 50.5 |
| | tan δ peak top ° C. | −11 | −10 | −11 | −8 | −9 | −12 | −10 | −11 | −11 | −11 |
| | Tackiness at 5° C. N | 18.3 | 18.2 | 18.0 | 12.3 | 10.0 | 18.5 | 18.0 | 18.4 | 18.3 | 18.2 |
| | Tackiness at 35° C. N | 17.2 | 17.0 | 17.4 | 17.7 | 16.8 | 17.4 | 16.8 | 17.1 | 17.2 | 17.2 |
| | Temporal swelling | 6 | 6 | 5 | 3 | 1 | 5 | 5 | 6 | 6 | 3 |
| | Low-temperature pressure-sensitive adhesive force N/25 mm | 16.5 | 16.3 | 14.4 | 11.3 | 5.8 | 15.4 | 13.9 | 16.1 | 16.3 | 16.2 |
| | Low-temperature bending property | 5 | 5 | 4 | 3 | 1 | 4 | 4 | 5 | 5 | 3 |

These results reveal that the pressure-sensitive adhesive film of the present invention had great improvement in the problem of temporal blistering after low-temperature application. Further, it can be considered from the values of tackiness at 35° C. that the pressure-sensitive adhesive film of the present invention is good in applicability even at high temperatures (in summer).

REFERENCE SIGNS LIST

1 Layer of polyvinyl chloride resin film
2 Pressure-sensitive adhesive layer
3 Release paper
4 Edge width of squeegee
5 Laminate of release paper and pressure-sensitive adhesive layer
6 Polyvinyl chloride resin film
7 Metal laminating roller
8 Pressure roller
9 Pressure-sensitive adhesive film
10 Yield point strain
11 Yield point stress

The invention claimed is:

1. A pressure-sensitive adhesive film, comprising:
(α) a layer of a polyvinyl chloride resin film and (β) a pressure-sensitive adhesive layer in this order from a surface layer side,
wherein a surface of the pressure-sensitive adhesive layer (β) has a tackiness of 12 to 25 N at a temperature of 5° C., and the surface of the pressure-sensitive adhesive layer (β) has a tackiness of 12 to 23 N at a temperature of 35° C.,
wherein the pressure-sensitive adhesive layer comprises a pressure sensitive adhesive comprising an acrylic polymer having a mass average molecular weight of from 500,000 to 1,000,000, as the only acrylic polymer, and a compound having two or more isocyanate groups per molecule, the compound having two or more isocyanate groups per molecule being contained in the adhesive in an amount of 1 to 1.6 parts by mass relative to 100 parts by mass of the acrylic polymer,
wherein the acrylic polymer is comprised of comonomers comprising at least one carboxyl group-containing monomer,
wherein the acrylic polymer has an acid value of 18 to 27 mg KOH/g,
wherein the acrylic polymer is comprised of constituent units derived from acrylic acid, butyl acrylate, and a hydroxyl group-containing acrylic monomer,
wherein the pressure-sensitive adhesive has a gel fraction of 45 to 75 mass %,
wherein the tackiness at a temperature of 5° C. is determined as follows: after the pressure-sensitive adhesive film is conditioned in an environment of a temperature of 5° C. and 50% relative humidity for 24 hours or more, the tackiness is measured in the same environment using a tackiness checker with a contact being a flat surface indenter under the conditions of a contact press force of 5 N, a press time of 3 seconds, and a number of repetition of tests of 5 times, and
wherein the tackiness at a temperature of 35° C. is determined as follows: after the pressure-sensitive adhesive film is conditioned in an environment of a temperature of 35° C. and 50% relative humidity for 24 hours or more, the tackiness is measured in the same environment using a tackiness checker with a contact being a flat surface indenter under the conditions of a contact press force of 5 N, a press time of 3 seconds, and a number of repetition of tests of 5 times, and
wherein a resin composition constituting the polyvinyl chloride resin film contains a polyvinyl chloride resin and a (meth)acrylic core-shell rubber.

2. The pressure-sensitive adhesive film according to claim 1, wherein the pressure-sensitive adhesive that forms the pressure-sensitive adhesive layer (β) satisfies property (b1) shown below:
(b1) the pressure-sensitive adhesive has a peak top value of tan δ on the lowest temperature side of −20° C. to −5° C.

3. The pressure-sensitive adhesive film according to claim 1, wherein the pressure-sensitive adhesive layer (β) has an air vent groove in an adhesive surface thereof.

4. The pressure-sensitive adhesive film according to claim 1 that is used for wallpaper.

5. The pressure-sensitive adhesive film according to claim 1, wherein the polyvinyl chloride resin film has a yield point stress of 30 to 39 MPa as measured at a temperature of 5° C.

6. The pressure-sensitive adhesive film according to claim 1, wherein the mass average molecular weight of the acrylic polymer is greater than 600,000 and 1,000,000 or less.

7. The pressure-sensitive adhesive film according to claim 1, wherein the (meth)acrylic core-shell rubber comprises a methacrylic acid ester-styrene/acrylic acid ester rubber graft copolymer.

8. The pressure-sensitive adhesive film according to claim 1, wherein the resin composition constituting the polyvinyl chloride resin film further contains a phthalate plasticizer that is dinormal octyl phthalate.

* * * * *